(12) United States Patent
Harrison et al.

(10) Patent No.: US 7,986,778 B2
(45) Date of Patent: Jul. 26, 2011

(54) CRYPTOGRAPHIC METHOD AND APPARATUS

(75) Inventors: Keith Alexander Harrison, Monmouth (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1062 days.

(21) Appl. No.: 11/166,921

(22) Filed: Jun. 23, 2005

(65) Prior Publication Data

US 2006/0013389 A1 Jan. 19, 2006

(30) Foreign Application Priority Data

Jun. 23, 2004 (GB) .................................. 0414062.0

(51) Int. Cl.
*H04K 1/00* (2006.01)
(52) U.S. Cl. ......................................................... 380/30
(58) Field of Classification Search .................. 713/155, 713/150, 168–181; 380/30
See application file for complete search history.

(56) References Cited

U.S. PATENT DOCUMENTS

| | | | | |
|---|---|---|---|---|
| 4,351,982 A * | 9/1982 | Miller et al. | .................... | 380/30 |
| 4,590,470 A * | 5/1986 | Koenig | ......................... | 340/5.74 |
| 4,748,668 A * | 5/1988 | Shamir et al. | .................. | 380/30 |
| 5,150,411 A * | 9/1992 | Maurer | ........................... | 380/30 |
| 5,436,972 A * | 7/1995 | Fischer | .......................... | 380/286 |
| 5,910,989 A * | 6/1999 | Naccache | ..................... | 713/173 |
| 6,275,936 B1 * | 8/2001 | Kyojima et al. | .............. | 713/182 |
| 6,332,193 B1 * | 12/2001 | Glass et al. | .................... | 713/170 |
| 2002/0103999 A1 | 8/2002 | Camnisch et al. | | |
| 2003/0955661 | 5/2003 | Harrison | ....................... | 380/231 |
| 2004/0151310 A1 | 8/2004 | Fu et al. | | |
| 2004/0252830 A1 | 12/2004 | Chen et al. | | |
| 2005/0002528 A1 * | 1/2005 | Chen et al. | ..................... | 380/255 |
| 2005/0262353 A1 * | 11/2005 | Gentry et al. | .................. | 713/176 |

FOREIGN PATENT DOCUMENTS

| | | |
|---|---|---|
| GB | 2 384 406 A | 7/2003 |
| GB | 2 395 872 A | 6/2004 |
| WO | 03/017559 A2 | 2/2003 |

OTHER PUBLICATIONS

Chen, L., K. Harrison, A. Moss, D. Soldera, and N. P. Smart. "Certifications of Public Keys within an Identity Based System." (2002): 323-33.*
Chen, L., K. Harrison, D. Soldera, and N. P. Smart. "Applications of Multiple Trust Authorities in Pairing Based Cryptosystems." (2002): 260-75.*
Chen, Liqun, and Caroline Kudla. "Identity Based Authenticated Key Agreement Protocols from Pairings." (2003).*

(Continued)

*Primary Examiner* — Ponnoreay Pich
*Assistant Examiner* — John B King

(57) ABSTRACT

A cryptographic method and apparatus is provided in which an identifier-based encryption process is used to encrypt a message with an identifier string that specifies conditions to be checked by a trusted entity before providing a decrypted form of the encrypted message, or enabling its decryption. A further trusted entity is used to verify the identity of the message sender as indicated by a further identifier string, and to provide the sender with a secret key that the sender uses to generate complimentary signature components. These signature components are sent along with the encrypted message and are used, along with other data including the first identifier string and a public key of the further trusted entity, to authenticate the identity of the message sender.

34 Claims, 3 Drawing Sheets

OTHER PUBLICATIONS

Cramer, e al., "Signature Schemes Based on the Strong RSA Assumption," (2000).

Tanaka, "Identity-Based Non-Interactive Key Sharing Equivalent to RSA Public-Key Cryptosystem," (1998).

Chaum, D., "Blind Signatures for Untraceable Payments," *Advances in Cryptology—Crypto '82*, pp. 199-203, (1998), retrieved from Internet at: http://dsns.csie.netu.edu.tw/research/crypto/HTML/PDF/C82/199.pdf.

Mohammed, E., et al., "A Blind Signature Scheme Based on ElGamal Signature," *Eurocomm 2000, Information Systems for Enhanced Public Safety and Security*, IEEE/AFCEA, pp. 51-53 (May 17, 2000).

Mont, M., et al., "IBE Applied to Privacy and Identity Management," *HP Labs Technical Report*,, retrieved from Internet at:<http://www.hpl.hp.com/ techreports/2003/HPL-2003-101.html>, pp. 1-13 (2003).

Bellare, M. and Phillip Rogaway, "Optimal Asymmetric Encryption—How to Encrypt with RSA," *Advances in Cryptology—Eurocrypt 94 Proceedings*, vol. 950, pp. 92-111, Springer-Verlag (1994).

Boneh, D. and M. Franklin, "Identity-Based Encryption from the Weil Pairing," *Advances in Cryptology—CRYPTO 2001*, LNCS 2139, pp. 213-229, Springer-Verlag (2001).

Boneh, D., et al., "Identity-Based Mediated RSA," *3rd Workshop on Information Security Application*, Jeju Island, Korea, 12 pages (Aug. 2002).

Chen, L. and K. Harrison, "Multiple Trusted Authorities in Identifier Based Cryptography from Pairings on Elliptic Curves," *Hewlett-Packard Technical Reports*, accessed via internet: <http://www.hpl.hp.com/techreports/2003/HPL-2003-48.html> Mar. 19, 2003.

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

ElGamal, T., "A Public Key Cryptosystem and a Signature Scheme Based on Discrete Logarithms," *IEEE Transactions on Information Theory*, vol. IT-31, No. 4, pp. 469-472 (Jul. 1985).

ISO/IEC FDIS 1488-2, "Information Technology—Security techniques—Digital Signatures with appendix—Part 2: Identity-based mechanisms," M. Chawrun, ed., 20 pages (Oct. 6, 1998).

U.S. Appl. No. 11/150,623, filed Jun. 10, 2005, Harrison, et al.

\* cited by examiner

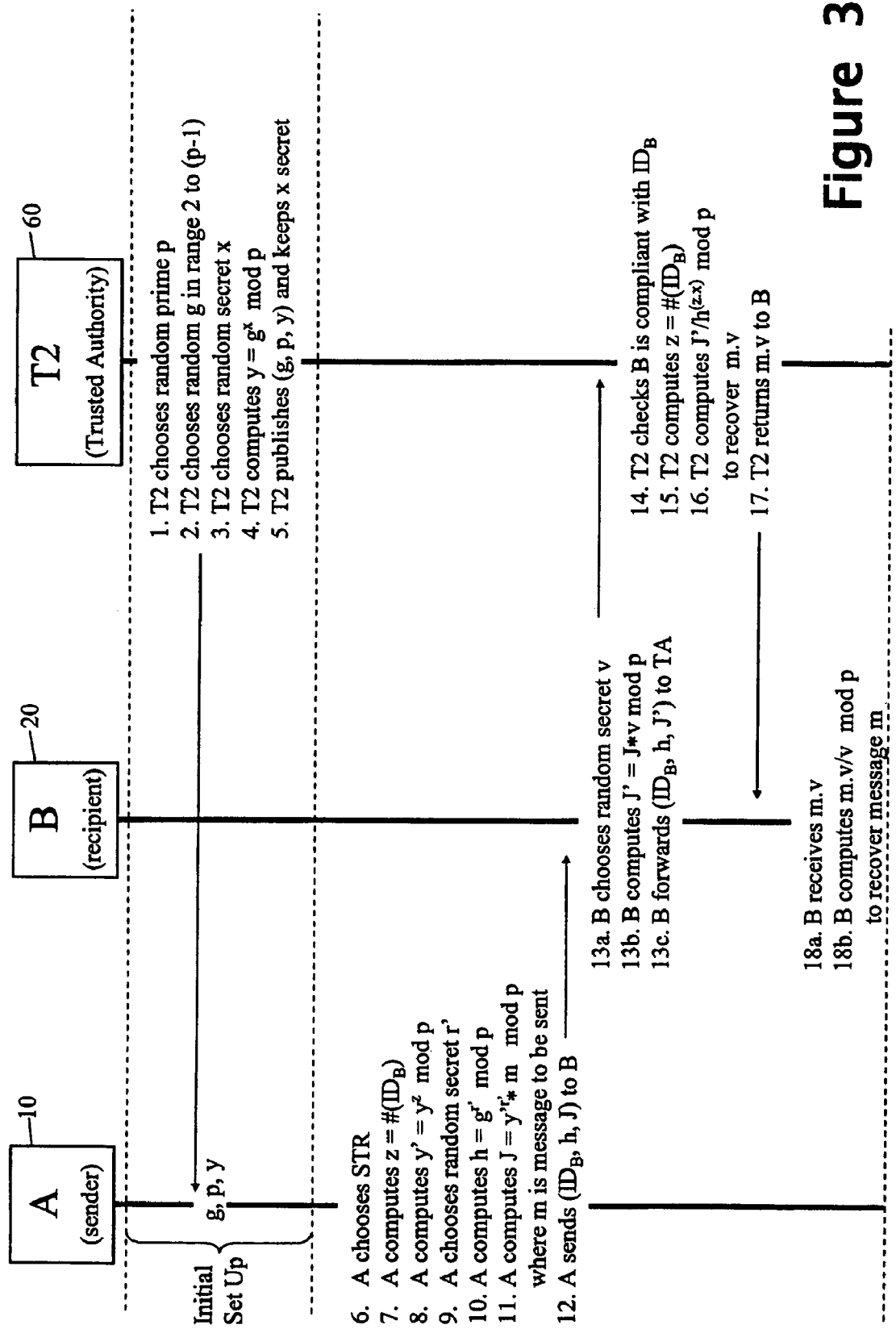

CRYPTOGRAPHIC METHOD AND APPARATUS

FIELD OF THE INVENTION

The present invention relates to a cryptographic method and apparatus; in particular, the present invention relates to an identifier-based cryptographic method and apparatus. Preferred embodiments of the invention utilise the identifier-based (IB) cryptographic methods and apparatus described in our co-pending US patent applications:

U.S. Ser. No. 10/866,053 relating to RSA-based IB cryptographic methods; and
U.S. Ser. No. 11/166,921 relating to ElGamal-based IB cryptographic methods.

As is well known to persons skilled in the art, in "identifier-based" cryptographic methods a public, cryptographically unconstrained, string is used in conjunction with public data of a trusted authority to carry out tasks such as data encryption or signing. The complementary tasks, such as decryption and signature verification, require the involvement of the trusted authority to carry out computation based on the public string and its own private data. In message-signing applications and frequently also in message encryption applications, the string serves to "identify" a party (the sender in signing applications, the intended recipient in encryption applications); this has given rise to the use of the label "identifier-based" or "identity-based" generally for these cryptographic methods. However, at least in certain encryption applications, the string may serve a different purpose to that of identifying the intended recipient and, indeed, may be an arbitrary string having no other purpose than to form the basis of the cryptographic processes. Accordingly, the use of the term "identifier-based" herein in relation to cryptographic methods and systems is to be understood simply as implying that the methods and systems are based on the use of a cryptographically unconstrained string whether or not the string serves to identify the intended recipient. Furthermore, as used herein the term "string" is simply intended to imply an ordered series of bits whether derived from a character string, a serialized image bit map, a digitized sound signal, or any other data source.

BACKGROUND OF THE INVENTION

Identifier-Based Encryption (IBE) is an emerging cryptographic schema. A number of IBE cryptographic methods are known, including:

methods based on "Quadratic Residuosity" as described in the paper: "An identity based encryption scheme based on quadratic residues", C. Cocks, Proceedings of the 8$^{th}$ IMA International Conference on Cryptography and Coding LNCS 2260, pp 360-363, Springer-Verlag, 2001;

methods using Weil or Tate pairings—see, for example: D. Boneh, M. Franklin—"Identity-based Encryption from the Weil Pairing" in *Advances in Cryptology—CRYPTO 2001*, LNCS 2139, pp. 213-229, Springer-Verlag, 2001;

methods based on mediated RSA as described in the paper "Identity based encryption using mediated RSA", D. Boneh, X. Ding and G. Tsudik, 3rd Workshop on Information Security Application, Jeju Island, Korea, August, 2002.

Generally, in IB encryption/decryption methods, a trusted party carries out one or more actions (such as identity checking) in accordance with information in the sender-chosen string, before enabling a recipient to recover a message encrypted by a message sender. Usually, the trusted party will generate an IB decryption key and provide it to the recipient for the latter to use in decrypting the encrypted message. However, it is also possible to provide IB encryption/decryption methods in which the trusted party carries out the decryption. This is the case for the RSA-based IB method described in U.S. Pat. No. 6,275,936 where the decryption exponent is dynamically computed from the encryption exponent, the latter being a hash of the sender-chosen string. A potential disadvantage of the trusted party carrying out message decryption is that it risks compromising the recipient's privacy. In the afore-mentioned US patent, this potential disadvantage is overcome by the recipient blinding the encrypted message before passing it to the trusted party (a decryption box) and then un-blinding the returned decrypted, but still blinded, message.

In many applications, it is not just the identity of the recipient that is required to be authenticated but also that of the message sender. Of course, there are a number of known ways of achieving sender authentication the most notable of which involves the message sender using a private key to sign the message; in this case, a recipient uses the corresponding public key to check the signature. However, this approach relies on the existence of a public key infrastructure usable by the recipient to assuredly relate the public key to a particular party.

Identifier-based signature methods are known such as those disclosed in ISO/IEC 14888-2, published 1999.

It is an object of the present invention to provide identifier-based cryptographic methods and apparatus with sender authentication.

SUMMARY OF THE INVENTION

According to a first aspect of the present invention, there is provided a cryptographic method comprising:

a first trusted entity, with a first public/private key pair:
  verifying that a first identifier string is associated with a first party;
  generating a secret key using its private key and the first identifier string; and
  providing the secret key to the first party;
the first party:
  using the secret key and a random secret to generate complementary signature components signing a public data element;
  encrypting a message by an identifier-based encryption process with encryption parameters comprising the public key of a second public/private key pair associated with a second trusted entity, and a second identifier string comprising conditions to be checked by the second trusted authority; and
  outputting the encrypted message and the signature components.

This enables the second trusted entity both to verify the first party's identity and to verify the compliance with the conditions in the second identifier string, before the second trusted party decrypts, or enables decryption of, the encrypted message. More particularly, extended to include the second trusted entity, the above method of the invention further comprises the second trusted entity:

verifying that the signature components originated with the first party as identified by the first identifier string verified by the first trusted party, by a verification test taking as input at least the signature components, the first identifier string, the public key of the first trusted party, and the public data element;

verifying that the conditions set out in the second identifier string are satisfied; and controlling availability of a decrypted form of the encrypted message in dependence on the outcomes of the verifying operations.

According to another aspect of the present invention, there is provided apparatus for use in a cryptographic method in which a first trusted entity, with a first public/private key pair, provides a first party with a secret key, generated using the first private key and a first identifier string, after verifying that the first identifier string is associated with the first party; the apparatus being arranged to encrypt a message on behalf of the first party and comprising:

a signing arrangement arranged to use said secret key of the first party and a random secret to generate complementary signature components signing a public data element;

an encryption arrangement arranged to encrypt a message by an identifier-based encryption process with encryption parameters comprising the public key of a second public/private key pair associated with a second trusted entity, and a second identifier string comprising at least one condition to be checked by the second trusted authority; and an output arrangement for outputting the encrypted message and the signature components.

According to a further aspect of the present invention, there is provided Apparatus for use in a cryptographic method in which:

a first trusted entity, with a first public/private key pair, provides a first party with a secret key, generated using the first private key and a first identifier string, after verifying that the first identifier string is associated with the first party, the first party uses its said secret key and a random secret to generate complementary signature components signing a public data element; and the first party encrypts a message by an identifier-based encryption process with encryption parameters comprising the public key of a second public/private key pair associated with a second trusted entity, and a second identifier string comprising at least one condition to be checked by the second trusted authority;

the apparatus comprising an input arrangement for receiving said signature components;

a verification arrangement arranged to verify that the signature components originated with the first party as identified by the first identifier string verified by the first trusted entity, by a verification test taking as input at least the signature components, the first identifier string, the public key of the first trusted entity, and the public data element.

BRIEF DESCRIPTION OF THE DRAWINGS

Embodiments of the invention will now be described, by way of non-limiting example, with reference to the accompanying diagrammatic drawings, in which:

FIG. 3 is a diagram illustrating an ElGamal-based IB encryption/decryption process for use in embodiments of the invention.

BEST MODE OF CARRYING OUT THE INVENTION

Figure 1:
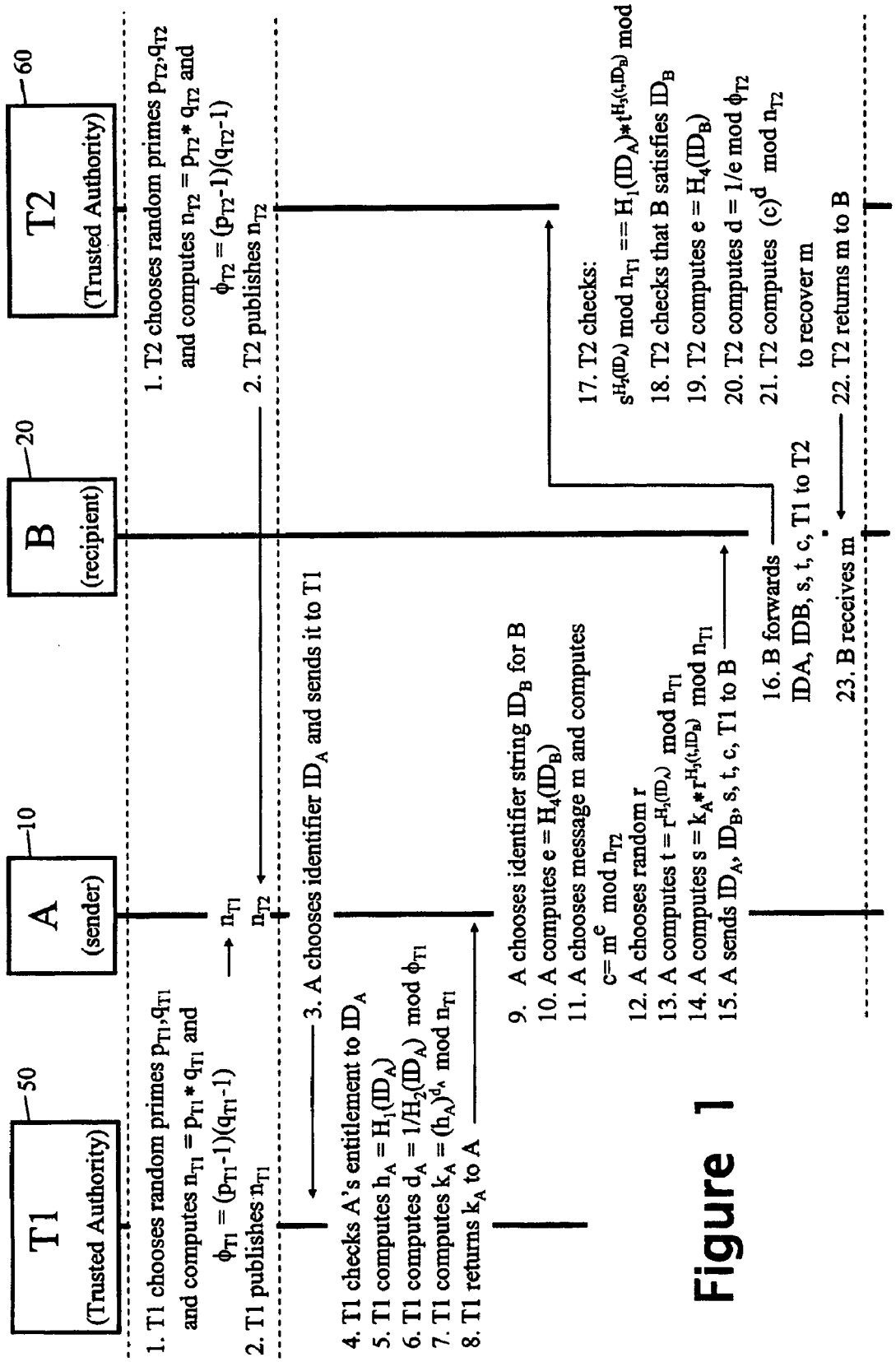
FIG. 1 is a diagram illustrating an RSA-based embodiment of the present invention.

The cryptographic methods and apparatus described below with respect to FIGS. 1 to 3 involve four parties, namely a message sender A acting through computing entity 10, a message receiver B acting through computing entity 20, a first trusted authority T1 acting through computing entity 50, and a second trusted authority T2 acting through computing entity 60. The computing entities 10, 20, 50 and 60 are typically based around program-controlled processors though some or all of the cryptographic functions may be implemented in dedicated hardware. The entities 10, 20, 50 and 60 inter-communicate, for example, via the internet or other computer network though it is also possible that two, three or all four entities actually reside on the same computing platform. For convenience, the following description is given in terms of the parties A, B, T1 and T2, it being understood that these parties act through their respective computing entities. It is also to be understood that the message m sent by the message sender to the message receiver can comprise any content and can, for example, simply be a symmetric cryptographic key.

The embodiment of the invention illustrated in FIG. 1 uses an RSA-based IB encryption/decryption method by which an identifier string $ID_B$ is used by the sender A to identify the intended recipient B to the trusted authority T2, the latter being responsible for ensuring that B can only access the message in clear if T2 is satisfied that B satisfies the identity conditions indicated by $ID_B$. Suitable RSA-based IB encryption/decryption methods are described in our above-mentioned patent application.

In addition to the identity of the receiver B being verified by T2, the identity of the sender A, as indicated by identifier string $ID_A$, is verified by T1 and used to produce a private key $k_A$ for A. The sender A uses the key $k_A$ to create signature components that can be used by T2 to confirm that they originated from A as identified by the T1-verified identity $ID_A$.

A more detailed description of the FIG. 1 method is given below.

Initial Set Up Phase

1. The trusted authority T1 chooses random primes $p_{T1}=2p_{T1}'+1$ and $q_{T1}=2q_{T1}'+1$ where both $p_{T1}'$ and $q_{T1}'$ are Sophie Germain primes. The primes $p_{T1}$ and $q_{T1}$ are specific to the trusted authority T1 and are not sender dependent. T1 then computes a public/private key pair:

$$n_{T1}=(p_{T1})\cdot(q_{T1}) \text{ and}$$

$$\phi_{T1}=(p_{T1}-1)\cdot(q_{T1}-1).$$

Similarly, trusted authority T2 chooses random primes $p_{T2}=2p_{T2}'+1$ and $q_{T2}=2q_{T2}'+1$ where both $p_{T2}'$ and $q_{T2}'$ are Sophie Germain primes. The primes $p_{T2}$ and $q_{T2}$ are specific to the trusted authority T2 and are not recipient dependent. T2 then computes public/private key pair:

$$n_{T2}=(p_{T2})\cdot(q_{T2}) \text{ and}$$

$$\phi_{T2}=(p_{T2}-1)\cdot(q_{T2}-1).$$

2. T1 publishes $n_{T1}$ and T2 publishes $n_{T2}$ (for example, in respective certificates).

Message Transfer Phase

Registration of A with Trusted Authority T1

3. A sends T1 an identifier string $ID_A$ for A.

4. T1 receives the identifier string $ID_A$ from A and checks that A is entitled to use it (that is, that it is appropriate to identify A or otherwise represent A).

5. T1 computes $h_A \leftarrow H_1(ID_A)$ where $H_1$ is a first hash function.
6. T1 computes $d_A \leftarrow 1/H_2(ID_A) \mod \phi_{T1}$ where $H_2$ is a second hash function.
7. T1 computes secret key $k_A \leftarrow (h_A)^{d_A} \mod n_{T1}$
8. T1 sends $k_A$ to A.

Encryption and Signing by A

9. A chooses an identifier string $ID_B$ to identify B.
10. A computes $e \leftarrow H_4(ID_B)$ where $H_4$ is a fourth hash function giving e as odd (note, the third hash function $H_3$ is first mentioned in step 14 below).
11. A chooses a message m and encrypts it to form ciphertext c:

$$c \leftarrow m^e \mod n_{T2}$$

12. A chooses a random number r
13. A computes $t \leftarrow r^{H_2(ID_A)} \mod n_{T1}$
14. A computes $s \leftarrow (k_A) r^{H_3(t,u)} \mod n_{T1}$ where $H_3$ is a third hash function carried out on a deterministic combination of t and public data u where, for example, u comprises $ID_B$ as illustrated in FIG. 1.
15. A sends B: $ID_A$, $ID_B$, s, t, c, and an indicator of the trusted authority T1 with which A is registered (unless there is only one possible candidate for T1). The elements s and t form complementary signature components of A's signature of the public data u using the secret key $k_A$. If u differs from $ID_B$, then u must also be made available.

Verification and Decryption

16. B forwards to T2: $ID_A$, $ID_B$, s, t, c, and the T1 indicator (again, if u differs from $ID_B$, then u must also be made available).
17. After accessing the value $n_{T1}$ for the indicated trusted authority T1, T2 checks:

$$s^{H_2(ID_A)} \mod n_{T1} = (H_1(ID_A)) t^{H_3(t,u)} \mod n_{T1}$$

where, in the present example, u comprises $ID_B$. This check, if passed, confirms that the signature components s and t originated from a party verified by T1 as entitled to the identifier $ID_A$.
18. T2 checks that B satisfies $ID_B$.
19. T2 computes $e \leftarrow H_4(ID_B)$.
20. T2 computes $d \leftarrow 1/e \mod \phi_{T2}$
21. T2 decrypts the ciphertext c to recover the message m:

$$m \leftarrow c^d \mod n_{T2}$$

22. T2 sends the decrypted message to B.
23. B receives the decrypted message m.

Steps 17 and 18 can be effected in any order or in parallel. Steps 19 to 23 are only carried out if the verification tests of steps 17 and 18 are successful alternatively, steps 18 to 22 can be carried out independently of steps 17 and 18 with steps 22 and 23 only being effected if the verification steps are successful. A further possibility is to have T2 securely pass the decryption key d to B rather than the decrypted message, it then being up to B to decrypt the message. Yet another possibility is for T2 to pass B the decrypted message or decryption key even if the identity of the sender cannot be verified (that is, even if the test in step 17 fails); in this situation, T2 would warn B that the source of the message is suspect. In all cases it can be seen that T2 controls the availability of a decrypted form of the encrypted message in dependence on the outcomes of the verifying tests.

It is also possible to arrange for the sender-identity verification test of step 17 to be carried out by the receiver B rather than by T2.

Integrity

The transmissions between the parties should be integrity protected in some manner, by which is meant that it should be possible for the receiving party to detect whether any of the data elements transmitted has been altered. In particular, the sender-authentication data elements should preferably be bound to the ciphertext c so that any substitution of the ciphertext can be detected.

Integrity protection can be effected in a number of ways. For example, a padding scheme can be used that enables integrity checking of the package of elements being transmitted; one suitable padding scheme is OAEP (M. Bellare and P. Rogaway. Optimal Asymmetric Encryption—How to Encrypt with RSA. In Advances in Cryptology-Eurocrypt '94, pp. 92-111, Springer-Verlag, 1994. Alternatively, the package of data elements can be wrapped by any suitable mechanism allowing integrity checking (such as a signature over the package). A further possibility is for A to form a hash of the message m and use it as all or part of the public data u that it signs with the secret key $k_A$ to generate the signature components s and t. The public data u is made available to B and therefore B can use it to check the integrity of the decrypted message m (or else T2 can do this). If the message is changed then either this integrity check will fail (because the message hash has been left unchanged) or the check carried out by T2 in step 17 will fail (because the message hash has been changed from that used in creating s).

Blinding

A potential drawback of the FIG. 1 embodiment is that T2 can read the messages m. In order to prevent this, B can blind the encrypted message before sending it to T2 for decryption, B subsequently un-blinding the decrypted, but still blinded, message returned by the T2 to recover the message m. By way of example, step 16 of FIG. 1 can be replaced by:

16a. B chooses a blinding secret v (for example, 1024 bits).
16b. B computes $c' = c.v^e \mod n_{T2}$
16c. B forwards to T2: $ID_A$, $ID_B$, s, t, c', and the T1 indicator.

T2 carries out its processing steps 17 to 22 as before but using c' rather than c; the result of step 21 is now the recovery of m.v—that is, the blinded but decrypted message—rather than the message m. In order for B to un-blind the message, step 23 now becomes:

23a. B receives the blinded, decrypted message m.v.
23b. B computes $(m.v/v) \mod n_{T2}$ to recover the message m; thereafter, B destroys v.

It will be appreciated that the blinding/un-blinding operations can differ from those described above. For example, blinding can be effected by computing a modulo-$n_{T2}$ multiplication of c by $v^{-e}$, in which case un-blinding would be effected by a modulo-$n_{T2}$ multiplication by v of the decrypted, but still blinded, message returned by T2.

Another way of preventing T2 from reading the message m would be to use the above-referenced identity based mediated RSA method described by D. Boneh, X. Ding and G. Tsudik for effecting encryption/decryption of the message m; in this case, the division of the decryption key between B and T2 means that T2 is not able to fully decrypt the message.

Hiding the Sender's Identity

If the sender A does not want anyone else except for either T2 or B or both to be able to see A's identity and signature, then A has a number of options, including:

(i) A computes ciphertext $c = E(ID_A \| s \| m)$ instead of $c = E(m)$, where E is encryption and $\|$ represents concatenation. If B does not want T2 to see A's identity or the message m, then B blinds c before forwarding it (as c') to T2; in this case, verifying the sender's identity must be done by B. However, if B allows T2 to see the signature s and message m, B forwards c to T2 without blinding; it is then up to T2 whether or not to return the decrypted signature s and/or message m to B.

(ii) A computes two ciphertexts c=E(m) and c"=E($ID_A$∥s). B can then optionally blind either the encrypted message or the encrypted signature (or both) before passing them to T2.

In all of these options, t can be transferred in a clear text and concatenation can be replaced by another reversible combination function.

Further Generalisations of Sender Authentication Process

Whilst the public data element u signed by sender A using the secret key $k_A$ can be any data available to A and T2, certain advantages can be obtained by suitable choice of the contents of u as has already been indicated above in relation to using the hash of the message m for u to enable integrity checking to be carried out. Generally, the public data element u provides a convenient way of linking the sender authentication data elements to the encryption/decryption process; the public data element u therefore preferably either comprises, or is related to, an element involved in the encryption/decryption process. Thus, for example, by using $ID_B$ for u as in the embodiment illustrated in FIG. 1, it is possible to ensure that even if the ciphertext c is substituted with one encrypted using a different $ID_B$, it is not possible to change the recipient because only the original value of $ID_B$ will suffice for the check carried out in step 17 (and the $ID_B$ used for this check is also that used to check the identity of B).

The data element $h_A$ signed by T1 using the secret key $d_A$ need not be a hash of $ID_A$ and can be any data known to both T1 and T2 so that T2 can carry out the step 17 check. The reason for this is that the key $d_A$ has been formed from $ID_A$ which thereby locks the identity of the sender into the key $k_A$ so that it is not essential that the data signed using $d_A$ is $ID_A$.

Alternatively, where the data signed using $d_A$ does comprise $ID_A$, then the key $d_A$ can be formed as the inverse of an element that is not $ID_A$ but some other data element such as a fixed small prime (provided it is known to, or made available to, T2).

It will be appreciated that $ID_A$ and $k_A$ form a public/private key pair for the sender A and that $h_A$ and $d_A$ effectively form a further public/private key pair for the trusted authority T2 (albeit of a transient nature in that it will generally only exist, so far as T1 is concerned, during creation of $k_A$ in respect of $ID_A$).

Figure 2:
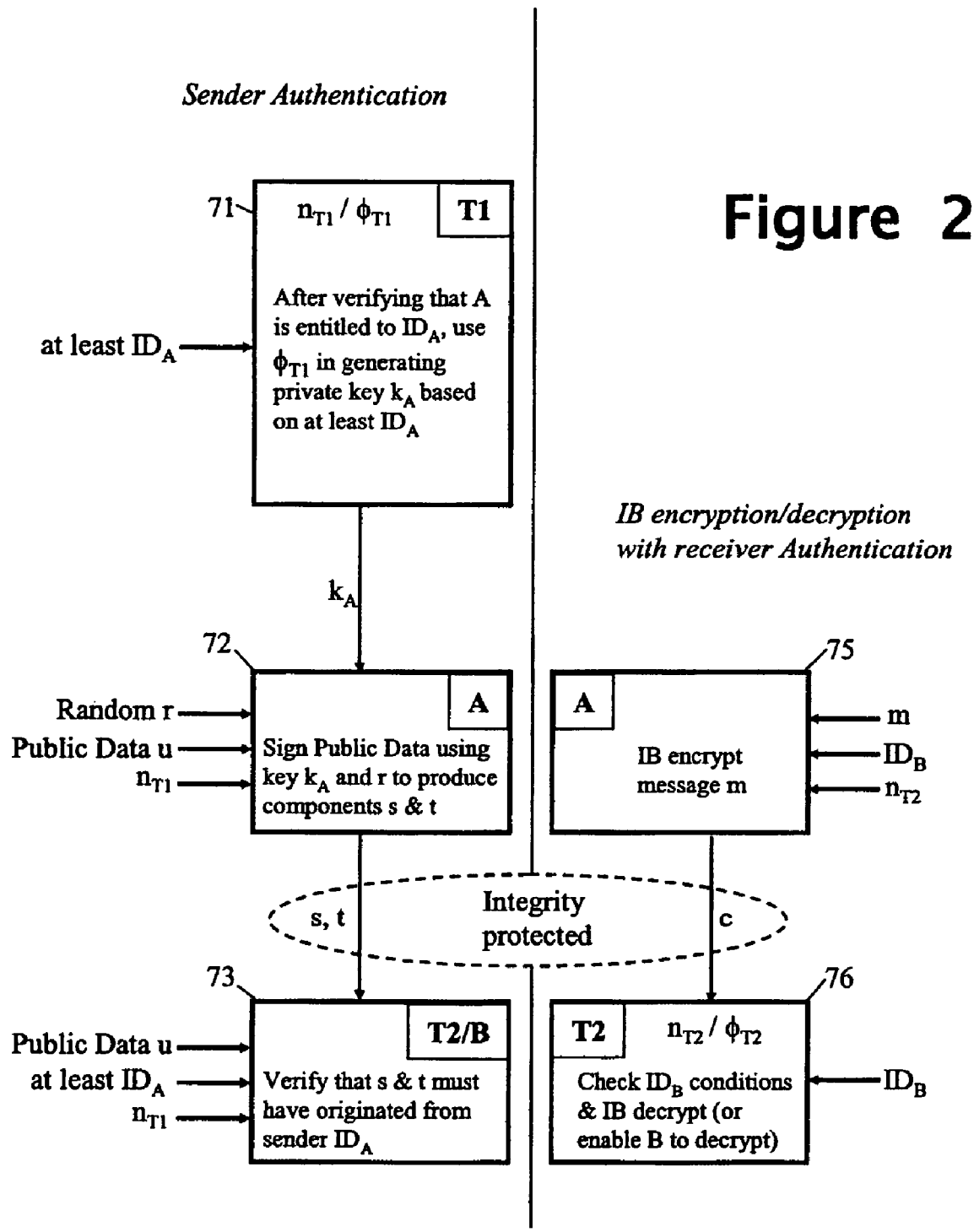
FIG. 2 is a diagram illustrating a generalised IB cryptographic method embodying the invention.

FIG. 2 depicts a generalized form of the FIG. 1 method (without blinding and without encryption of s). In this depiction, the left-hand side illustrates the sender authentication process as three blocks 71, 72 and 73 whilst the right-hand side illustrates the IB encryption/decryption of the message m as two blocks 75 and 76. Considering first the sender authentication process, block 71 represents the operations carried out by the trusted authority T1; in effect, T1 takes as input the sender identifier string $ID_A$ and after verifying A's entitlement to it, T1 uses $ID_A$, along with its private key $\phi_{T1}$, to generate the secret key $k_A$. The manner in which $k_A$ is generated is such that it involves an invertible operation using parameters comprising, or influenced by, $ID_A$ and T1's private key $\phi_{T1}$ (step 7 in the FIG. 1 embodiment); this invertible operation is such that it can subsequently be inverted by an operation involving T1's public key $n_{T1}$—in other words, $k_A$ effectively provides T1's verifiable signature in respect of $ID_A$. The secret key $k_A$ is provided to the sender A which now uses it to prove to others that its identity has been authenticated by T1; however, sender A cannot simply send $k_A$ in clear as this would enable anyone to impersonate A. Accordingly, sender A hides $k_A$ by using it, along with a random secret r, to sign the public data element u, thereby producing complementary signature components s and t both of which include the random r (block 72); the operations performed by sender A can be considered a signature on the basis that, apart from T1, only A knows the secret key $k_A$. In due course, the trusted authority T2 (or B) carries out a verification check (block 73) that involves both inverting the aforesaid invertible operation and using s and t in manner that terms involving r balance each other out.

The IB encryption/decryption process represented by blocks 75 and 76 can be any suitable IB process though preferably the computation operations involved are of the same type as used for the sender authentication process. As already discussed, the transmission of the encrypted message and of the signature components s and t is integrity protected. Other linkages may exist between the sender authentication process and the IB encryption/decryption process, such as the use of $ID_B$ both for the encryption key string in the IB encryption of message m and for the public data u.

It should also be noted that the sender identifier string $ID_A$ need not uniquely identify A and in general terms can be any set of one or more attributes that the sender A allegedly possesses, it being the responsibility of the trusted authority T1 to check whether or not this is so.

RSA Cryptographic Considerations

As is well known, in RSA methods the encryption exponent e must have no common factors with $\phi_{T2}$. However, in the above-described embodiment the encryption exponent e is based on a string created by the sender rather than being generated by the trusted authority T2 to meet the requirement that e has no common factors with $\phi_{T2}$. In order to meet this requirement, the following constraints, already noted above in relation to the FIG. 1 embodiment, can be imposed, namely:

the function used to generate the encryption exponent is such that e is always odd; and $p_{T2}=(2p_{T2}'+1)$ and $q_{T2}=(2q_{T2}'+1)$ where $p_{T2}'$ and $q_{T2}'$ are Sophie Germain primes.

These constraints together serve to ensure, with a very high probability, that the encryption exponent e and $\phi_{T2}$ will have no common factors. Other constraints for achieving the same objectives are also possible.

Furthermore, with RSA methods it is accepted that one should avoid encrypting the same message multiple times with different exponents that are coprime, since an attacker could then use the Extended Euclidean Algorithm to recover the original message. Various solutions are available:

Use random padding of the message to ensure that the same message is never encrypted twice. The basic message content is thus combined with random padding and a message-content length indicator to form the message m to be encrypted.

Ensure that the same message content is never re-sent—whilst this is possible to do in theory (for example, by storing all sent messages and checking any new message against the stored messages) in reality this solution is only practical in limited situations.

Ensure that the exponents are never coprime (that is, values of e derived from different strings having a common divisor greater than one). This can be achieved, for example, by making all exponents a multiple of 3; thus e can be derived from the string $ID_B$ using a hash function # for which #($ID_B$)=3 mod 6—in other words:

$e=3(2(\#(ID_B))+1)$.

More generally, successive values of e can be:

$e=\alpha(2(\#(ID_B))+1)$ where $\alpha$ is an odd integer $\geq 3$, this value being fixed (that is, for each new message to be encrypted, the same value of $\alpha$ is used in the calculation of the encryption exponent e). The hash function is chosen such that the value of e is large (generally>>1024) and preferably lies within the range 1 to ($\phi_{T2}-1$).

Other Encryption/Decryption Methods

As an alternative to using an RSA-based IB encryption/decryption method for securely passing the message m to the party identified by the string $ID_B$, other IB encryption/decryption methods can be used. For example, the above-mentioned IB method based on ElGamal encryption/decryption can be used. Below is given an example implementation of this method but only in respect of the encryption/decryption of the message m, it being understood that the authentication of the sender is carried out in the same way as described above with respect to FIG. 1. This example implementation of the IB ElGamal encryption/decryption is depicted in FIG. 3 and includes blinding/un-blinding operations carried out by B (these operations can be omitted if B does not mind T2 seeing the message m). The step numbering used does not relate to that of the FIG. 1 embodiment.

Initial Set Up Phase
1. T2 chooses random prime p (for example, 1024 bits).
2. T2 chooses a random number g in the range 2 to (p−1).
3. T2 chooses a secret x (for example, a random, 160 bit, number).
4. T2 computes $y=g^x$ mod p.
5. T2 publishes (g, p, y) and keeps x secret.

Message Transfer Phase
Message Encryption by Sender A
6. A chooses an identifier string $ID_B$ for B.
7. A computes $z=\#(ID_B)$ where # is a hash function (for example, SHA-1 returning 160 bits).
8. A computes $y'=y^z$ mod p
9. A chooses a secret r' (for example a random, 160 bit, number, not related to r used for the signature process carried out by A in FIG. 1)
10. A computes $h=g^{r'}$ mod p
11. A computes $J=(y'^{r'})*m$ mod p
12. A sends ($ID_B$, h, J) to B and destroys r'.
(Steps 8 and 11 can be merged to have A compute J as: $(y^{z.r'})*m$ mod p)

Message Decryption for Recipient B by Trusted Authority T2
13a. B chooses a blinding secret v.
13b. B computes $J'=J.v$ mod $n_{T2}$
13c. B forwards ($ID_B$, h, J') to T2.
14. T2 checks that B meets the conditions set out in $ID_B$.
15. T2 computes $z=\#(ID_B)$.
16. T2 computes $J'/h^{(z,x)}$ mod p to recover the blinded, decrypted message m.v.
17. T2 returns blinded, decrypted message m.v to B.
18a. B receives the blinded, decrypted message m.v.
18b. B computes (m.v/v) mod $n_{T2}$ to recover the message m; B destroys v.

Again, the transmissions are preferably integrity protected in any suitable manner.

It will be appreciated by persons skilled in the art that g should be chosen randomly but such that:

$$g^q = 1 \bmod p$$

where q is a large prime (typically at least 160 bits) that divides (p−1).

It should be noted that the multiplication effected in step 11 can be replaced by any modulo-p invertible operation for combining $y^{r.z}$ and m (the operation being inverted in step 16). Thus, for example, J can be computed as:

$$m \oplus H(y^{r.z} \bmod p)$$

where $\oplus$ is the Exclusive-OR function and H is a hash function. The message is subsequently recovered by T2 computing:

$$J \oplus H(h^{x.z} \bmod p).$$

It is possible to interpret the FIG. 3 process in terms of T2 having a public key (p, g, y) and private key (x), with the sender A effectively modifying T2's public key using the hash of the string $ID_B$ as an exponent for exponentiation, modulo p, of the element y of that key. The sender A also supplies the string $ID_B$ to T2 to enable it to effect a complementary modification to its private key by multiplying the private key x by the hash of the string. Where the string $ID_B$ comprises information serving to identify an intended recipient B of the message m, the modification of T2's public key can be thought of as a customization of the public key to the intended recipient B.

The Identifier String $ID_B$

As regards the contents of the recipient identifier string $ID_B$ chosen by the sender, as already indicated this string may be any string though in many cases restrictions will be placed on the string—for example, the string $ID_B$ may be required to comply with a particular XML schema.

The string $ID_B$ will frequently comprise a condition identifying a specific intended message recipient; in this case, the trusted authority T2 carries out (step 14 of FIG. 1) an authentication process with the party B to check that B meets the recipient-identity condition.

Rather than identifying an intended recipient as a particular individual, the string $ID_B$ may comprise one or more conditions specifying one or more non-identity attributes that the recipient must possess; for example, a condition may specify that a recipient must have a certain credit rating. Again, it is the responsibility of the trusted authority T2 to check out this condition(s) before producing the decrypted message for a party presenting the encrypted message for decryption.

The string $ID_B$ may additionally or alternatively comprise one or more conditions unrelated to an attribute of the intended recipient; for example, a condition may be included that the message concerned is not to be decrypted before a particular date or time. Indeed, the string $ID_B$ can be used to convey to the trusted authority T2 information concerning any actions to be taken by the trusted authority when it receives the encrypted message for decryption. The information in the string $D_B$ may thus relate to actions to be taken by the trusted authority that do not affect message decryption—for example, the trusted authority T2 may be required to send a message to the message sender A at the time the T2 decrypts the message concerned. However, as already indicated, the information in the string $ID_B$ will generally specify one or more conditions to be checked by the trusted authority as being satisfied before the trusted authority decrypts the related encrypted message (or before returning the corresponding decrypted message to the recipient B concerned).

Whatever the conditions relate to, the string $ID_B$ may directly set out the or each condition or may comprises one or more condition identifiers specifying corresponding predetermined condition known to the trusted authority (in the latter case, the trusted authority uses the or each condition identifier to look up the corresponding condition to be checked).

Multiple Decryption TAs

Many variants are possible to the above-described embodiments of the invention. Thus, in certain situations it may be required that a message should only be decryptable with the cooperation of multiple trusted authorities each of which would typically have a different associated public and private data. One such situation where this may be desirable is where the sender wishes to impose multiple conditions but no single trusted authority is competent to check all conditions—in this case, different trusted authorities can be used to check different conditions. Another situation in which multiple trusted authorities may be required is where there is a concern that a trust authority may have access to the encrypted, but not blinded, messages passing from A to B and it is important to prevent the trust authority reading the messages—in this case, multiple trusted authorities can be used together in a manner such that no one authority can read the messages passing from A to B.

Various arrangements are possible for involving multiple trusted authorities in message decryption, including:

the sender organizes the message content as a number of data sets (say k data sets) by using Shamir's secret sharing scheme and then encrypts each data set using an associated string STR (for example, specifying a respective condition to be checked) and the public modulus of a respective one of the trusted authorities; in order to retrieve the message, a recipient B has to go to all of the trusted authorities in order to decrypt all of the data sets because any k−1 data sets or less cannot disclose any of the message contents.

the sender can use the encrypted data resulting from encrypting message data using a first string (for example, specifying a particular condition) and the public modulus of a first trusted authority as the data to be encrypted using a second string and the public modulus of a second trusted authority and so on; the encrypted data resulting from the encryption effected in respect of all trusted authorities to be used then being sent to the recipient B for decryption in successive decryption operations by the corresponding trusted authorities.

Where multiple trusted authorities are involved in message decryption, sender authentication can be carried out by all such trusted authorities or only by a subset (including one) of these authorities.

It is also possible to arrange for the initial verification of sender identity to be carried out by more than one trusted authority, for example by arranging for each such trusted authority to generate a respective $k_A$, each $k_A$ then being separately used by the sender to sign a public data element.

The invention claimed is:

1. A cryptographic method comprising:
a first trusted entity, with a first public/private key pair:
verifying that a first identifier string is associated with a first party;
generating a secret key using its private key and the first identifier string; and
providing the secret key to the first party;
the first party:
using the secret key and a random secret to generate multiple signature components, wherein use of the random secret and the secret key in the signature components enables verification of the first party as origin of the signature components without knowledge of the random secret;
encrypting a message by an identifier-based encryption process with encryption parameters comprising the public key of a second public/private key pair associated with a second trusted entity, and a second identifier string comprising at least one condition to be checked by the second trusted entity; and
outputting the encrypted message and the signature components.

2. The method according to claim 1, wherein the signature components sign a the public data element that comprises, or is related to, an element involved in the encrypting process carried out by the first party.

3. The method according to claim 2, wherein the public data element comprises the second identifier string.

4. The method according to claim 1, wherein the signature components sign a hash of the message.

5. The method according to claim 1, wherein the first party provides an integrity protection mechanism inter-relating the encrypted message and signature components such as to at least enable detection of any change to the encrypted message associated with the signature components.

6. The method according to claim 1, wherein the first trusted entity generates the secret key by a process comprising:
forming a further public/private key pair by using a hash of the first identifier string as the public key and creating the private key using this public key and the public key of the first key pair; and
using the private key of said further public/private key pair to effect an invertible operation on a public data element whereby to produce the secret key.

7. The method according to claim 6, wherein said public data element is based on the first identifier string.

8. The method according to claim 1, wherein the first trusted entity generates the secret key by a process comprising:
forming a further public/private key pair by using a public data element as, or as the basis of, the public key and creating the private key using this public key and the public key of the first key pair; and
using the private key of said further public/private key pair to effect an invertible operation on a hash of the first identifier string whereby to produce the secret key.

9. The method according to claim 1, wherein at least one said signature component and the first identifier string are output by the first party in encrypted form.

10. The method according to claim 9, wherein said at least one said signature component and the first identifier string are combined with the message to form a data package that is subject to said identifier-based encryption process.

11. The method according to claim 1, wherein the first trusted entity generates the secret key $k_A$ using the first identifier string $ID_A$ and the first public/private key pair $n_{T1}/\phi_{T1}$ by:
computing $h_A \leftarrow H_1(ID_A)$ where $H_1$ is a first hash function;
computing $d_A \leftarrow H_2(ID_A) \bmod \phi_{T1}$ where $H_2$ is a second hash function; and
computing $k_A \leftarrow (h_A)^{d_A} \bmod n_{T1}$.

12. A cryptographic method comprising:
a first trusted entity, with a first public/private key pair $n_{T1}/\phi_{T1}$:
verifying that a first identifier string $ID_A$ is associated with a first party;
generating a secret key $k_A$ using its private key $\phi_{T1}$ and the first identifier string $ID_A$ by:
computing $h_A \leftarrow H_1(ID_A)$ where $H_1$ is a first hash function;
computing $d_A \leftarrow H_2(ID_A) \bmod \phi_{T1}$ where $H_2$ is a second hash function; and
computing $k_A (h_A)^{d_A} \bmod n_{T1}$; and
providing the secret key $k_A$ to the first party;
the first party:
using the secret key $k_A$ and a random secret r to generate multiple signature components s and t signing a public data element u, wherein use of the random secret r in the signature components s and t enables verification of the first party as origin of the signature components s and t without knowledge of the random secret r;

encrypting a message by an identifier-based encryption process with encryption parameters comprising the public key of a second public/private key pair associated with a second trusted entity, and a second identifier string comprising at least one condition to be checked by the second trusted entity; and outputting the encrypted message and the signature components, wherein the first party uses the secret key $k_A$, the random secret r, the first identifier string $ID_A$, and the public key $n_{T1}$ of the first key pair to generate the signature components s and t signing said public data element u, by:

computing $t \leftarrow r^{H_2(ID_A)} \bmod n_{T1}$; and computing $s \leftarrow (k_A) r^{H_3(t,u)} \bmod n_{T1}$ where $H_3$ is a third hash function carried out on a deterministic combination of t and u.

13. The method according to claim 12, further comprising the second trusted entity:

verifying that the signature components originated with the first party as identified by the first identifier string verified by the first trusted entity, by checking the identity:

$$s^{H_2(ID_A)} \bmod n_{T1} == H_1(ID_A)) t^{H_3(t,u)} \bmod n_{T1}$$

verifying that said at least one condition set out in the second identifier string is satisfied; and controlling availability of a decrypted form of the encrypted message in dependence on the outcomes of the verifying operations.

14. The method according to claim 12, further comprising:

the second trusted entity verifying that said at least one condition set out in the second identifier string is satisfied, and controlling availability to a second party of a decrypted form of the encrypted message in dependence on the outcome of this verifying operation; and the second party verifying that the signature components originated with the first party as identified by the first identifier string verified by the first trusted entity, by checking the identity:

$s^{H_2(ID_A)} \bmod n_{T1} == (H_1(ID_A)) t^{H_3(t,u)} \bmod n_{T1}$.

15. The method according to claim 1, wherein the identifier-based encryption process used by the first party for encrypting the message is an RSA-based encryption process.

16. The method according to claim 1, wherein the identifier-based encryption process used by the first party for encrypting the message is an ElGamal-based encryption process.

17. The method according to claim 1, further comprising the second trusted entity:

verifying that the signature components originated with the first party as identified by the first identifier string verified by the first trusted entity, by a verification test taking as input at least the signature components, the first identifier string, the public key of the first trusted entity, and a public data element signed by the signature components;

verifying that said at least one condition set out in the second identifier string is satisfied; and controlling availability to a second party of a decrypted form of the encrypted message in dependence on the outcomes of the verifying operations.

18. The method according to claim 17, wherein the generation of the secret key by the first trusted entity involves creating a further public/private key pair and using the private key of this key pair to effect an invertible operation, the verification test involving the inversion of said invertible operation using the public key of said further key pair.

19. The method according to claim 17, wherein the second trusted entity controls availability of a decrypted form of the encrypted message by controlling decryption by itself of the encrypted message.

20. The method according to claim 17, wherein the second trusted entity controls availability of a decrypted form of the encrypted message by controlling the provision of said decrypted form, or of a decryption key, to the second party.

21. The method according to claim 17, wherein:

at least the encrypted message is passed to the second trusted entity via a second party, the second party prior to forwarding the encrypted message to the second trusted entity for decryption, subjecting it to a blinding operation using a secret random number; and the second trusted entity provides the decrypted, but still blinded message, back to the second party provided said at least one condition specified in the second identifier string has been found satisfied, the second party thereupon canceling the blinding to recover the message.

22. The method according to claim 1, further comprising:

the second trusted entity verifying that said at least one condition set out in the second identifier string is satisfied, and controlling availability to a second party of a decrypted form of the encrypted message in dependence on the outcome of the verifying operation; and the second party verifying that the signature components originated with the first party as identified by the first identifier string verified by the first trusted entity, by a verification test taking as input at least the signature components, the first identifier string, the public key of the first trusted entity, and a public data element signed by the signature components.

23. The method according to claim 22, wherein the generation of the secret key by the first trusted entity involves creating a further public/private key pair and using the private key of this key pair to effect an invertible operation, the verification test involving the inversion of said invertible operation using the public key of said further key pair.

24. The method according to claim 22, wherein the second trusted entity controls availability of a decrypted form of the encrypted message by controlling decryption by itself of the encrypted message.

25. The method according to claim 22, wherein the second trusted entity controls availability of a decrypted form of the encrypted message by controlling the provision of said decrypted form, or of a decryption key, to the second party.

26. The method according to claim 22, wherein:

at least the encrypted message is passed to the second trusted entity via a second party, the second party prior to forwarding the encrypted message to the second trusted entity for decryption, subjecting it to a blinding operation using a secret random number; and the second trusted entity provides the decrypted, but still blinded message, back to the second party provided said at least one condition specified in the second identifier string has been found satisfied, the second party thereupon canceling the blinding to recover the message.

27. The method according to claim 1, wherein said at least one condition comprises a condition relating to the identity of an intended recipient of said message.

28. The method according to claim 1, wherein said at least one condition comprises a condition concerning a non-identity attribute that an intended recipient of said message must possess.

29. Apparatus for use in a cryptographic method in which a first trusted entity, with a first public/private key pair, provides a first party with a secret key, generated using the first private key and a first identifier string, after verifying that the first identifier string is associated with the first party; the apparatus being arranged to encrypt a message on behalf of the first party and comprising:
- a processor;
- a signing arrangement that is implemented using said processor and is arranged to use said secret key of the first party and a random secret to generate multiple signature components signing a public data element, wherein use of the random secret and the secret key in the signature components enables verification of the first party as origin of the signature components without knowledge of the random secret;
- an encryption arrangement that is implemented using said processor and is arranged to encrypt a message by an identifier-based encryption process with encryption parameters comprising the public key of a second public/private key pair associated with a second trusted entity, and a second identifier string comprising at least one condition to be checked by the second trusted authority; and
- an output arrangement for outputting the encrypted message and the signature components.

30. The apparatus according to claim 29, wherein the public data element arranged to be signed by the signing arrangement using the secret key comprises, or is related to, an element which the encryption arrangement is arranged to use in encrypting said message.

31. A cryptographic system in which a first trusted entity, with a first public/private key pair, provides a first party with a secret key, generated using the first private key and a first identifier string, after verifying that the first identifier string is associated with the first party, the system comprising:
- an encryption apparatus including:
- a first processor;
- a signing arrangement that is implemented using the first processor and is arranged to use said secret key of the first party and a random secret to generate multiple signature components signing a public data element, wherein use of the random secret and the secret key in the signature components enables verification of the first party as origin of the signature components without knowledge of the random secret;
- an encryption arrangement that is implemented using said first processor and is arranged to encrypt a message by an identifier-based encryption process with encryption parameters comprising the public key of a second public/private key pair associated with a second trusted entity, and a second identifier string comprising at least one condition to be checked by the second trusted authority; and
- an output arrangement for outputting the encrypted message and the signature components; and
- a verification apparatus including:
- a second processor;
- an input arrangement for receiving said signature components; and
- a verification arrangement that is implemented using the second processor and is arranged to verify that the signature components originated with the first party as identified by the first identifier string verified by the first trusted entity, by a verification test taking as input at least the signature components, the first identifier string, the public key of the first trusted entity, and the public data element, wherein the verification arrangement can verify the first party as origin of the signature components without having knowledge of the random secret.

32. The system according to claim 31, wherein the generation of the secret key by the first trusted entity involves creating a further public/private key pair and using the private key of this key pair to effect an invertible operation, the verification arrangement being arranged, in carrying out verification of said signature components, to effect inversion of said invertible operation using the public key of said further key pair.

33. The method according to claim 1, wherein the at least one condition to be checked by the second trusted entity is selected from a group consisting of whether a current time is before a specified date or a time, whether the second trusted entity has sent a message to the first party, whether the second trusted entity has performed an action that does not affect message decryption has occurred, and whether multiple trusted authorities have performed specified actions.

34. The method according to claim 1, wherein the second identifier string comprises one or more conditions unrelated to an attribute of an intended recipient of the message.

* * * * *

UNITED STATES PATENT AND TRADEMARK OFFICE
CERTIFICATE OF CORRECTION

PATENT NO. : 7,986,778 B2  
APPLICATION NO. : 11/166921  
DATED : July 26, 2011  
INVENTOR(S) : Keith Alexander Harrison et al.

Page 1 of 1

It is certified that error appears in the above-identified patent and that said Letters Patent is hereby corrected as shown below:

In column 12, line 2, in Claim 2, delete "a the" and insert -- a --, therefor.

In column 12, line 48, in Claim 11, delete " $d_A \leftarrow H_2(ID_A)$ " and insert -- $d_A \leftarrow 1/H_2(ID_A)$ --, therefor.

In column 12, line 60, in Claim 12, delete " $d_A \leftarrow H_2(ID_A)$ ," and insert -- $d_A \leftarrow 1/H_2(ID_A)$ --, therefor.

In column 12, line 62, in Claim 12, delete " $k_A \ (h_A)^{d_A}$ " and insert -- $k_A \leftarrow (h_A)^{d_A}$ --, therefor.

Signed and Sealed this  
Thirty-first Day of January, 2012

David J. Kappos  
*Director of the United States Patent and Trademark Office*